United States Patent

[11] 3,612,181

[72] Inventor Fred A. Brooks, Jr.
Houston, Tex.
[21] Appl. No. 11,495
[22] Filed Feb. 16, 1970
[45] Patented Oct. 12, 1971
[73] Assignee Esso Production Research Company

[54] METHOD FOR CONSOLIDATING INCOMPETENT FORMATIONS
9 Claims, 1 Drawing Fig.

[52] U.S. Cl. .................................................... 166/295, 166/300
[51] Int. Cl. ...................................................... E21b33/138
[50] Field of Search .......................................... 166/295, 300, 294, 285

[56] References Cited
UNITED STATES PATENTS
3,176,767  4/1965  Brandt et al. .................. 166/295
3,448,800  6/1969  Parker et al. .................. 166/294

Primary Examiner—Stephen J. Novosad
Attorneys—James A. Reilly, John B. Davidson, Lewis H. Eatherton, James E. Gilchrist, Robert L. Graham and James E. Reed ABSTRACT: A method for the consolidation of incompetent formations wherein a thermosetting resin is injected into the formation through a first conduit and a curing agent for the resin is injected into the formation through a second conduit.

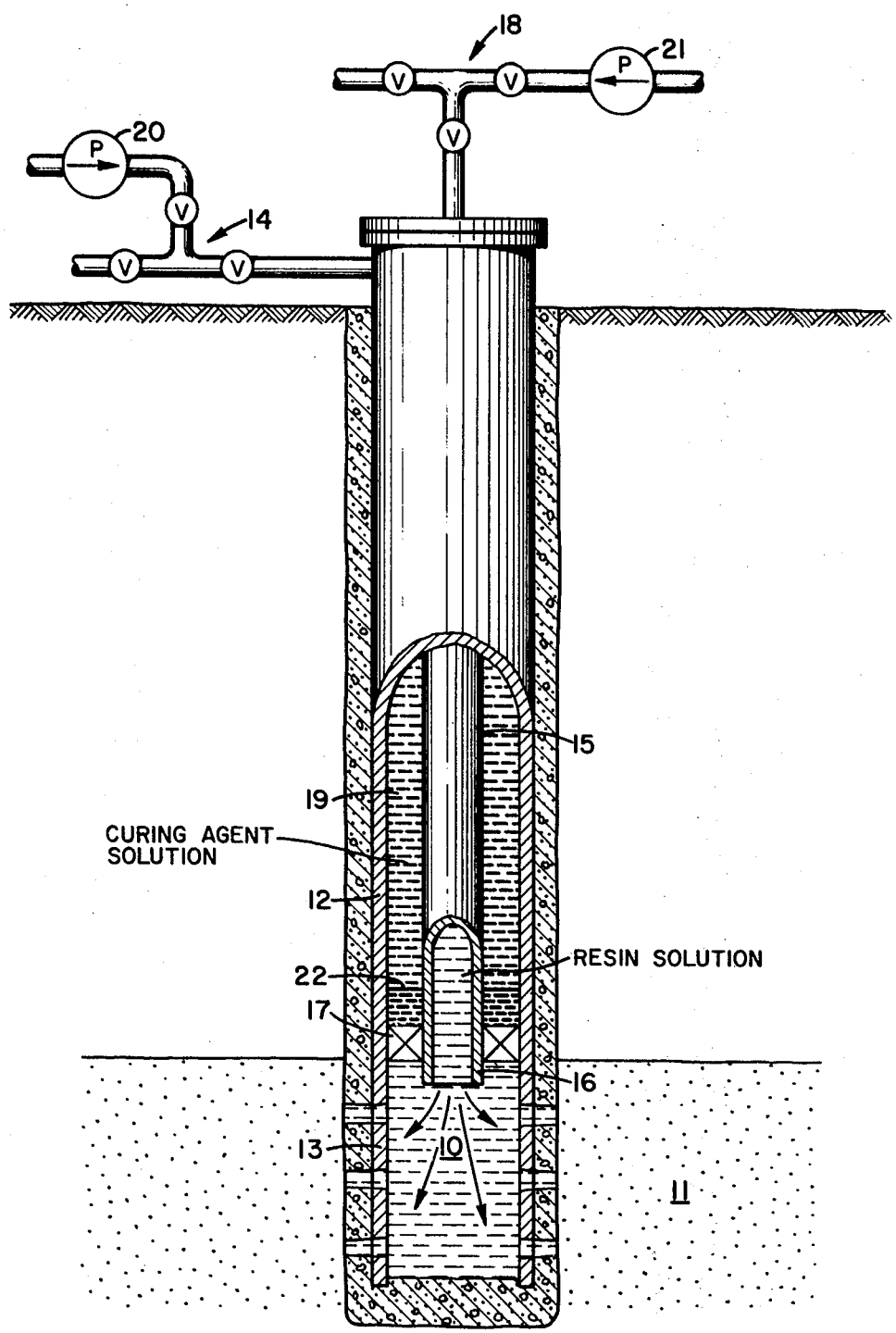

METHOD FOR CONSOLIDATING INCOMPETENT FORMATIONS

BACKGROUND OF THE INVENTION

1. Field of the Invention

This invention relates to the consolidation of incompetent formations. In one aspect it relates to a method of placing a resin and a curing agent in incompetent formations.

2. Description of the Prior Art

Several plastic consolidation techniques have been developed for controlling sand production in oil, gas and water wells completed in incompetent formations. These techniques generally involve introducing a liquid thermosetting resin into the formation and causing the resin to harden. The hardened plastic provides a bonding matrix for the loose sand grains forming a competent, permeable sheath about the wellbore.

The reactive chemicals, e.g. the resin and the resin curing agent, used in plastic consolidation treatments can be premixed at the surface (premixed system) or can be mixed in the formation to be treated (in situ mixed system). In the premixed system the chemicals are mixed at the surface with conditions being controlled to provide a slow reaction, and placed in the formation before the reaction is complete. Once the reactive components are mixed, the placement step must be completed in relatively short order to ensure that the mixture is displaced from the wellbore before the resin cures.

In the in situ mixed system, the reactive chemicals are introduced into the formation in sequential order so that the reaction does not begin until the components are brought together in the formation. This permits applications at temperatures higher than those recommended for the premixed systems. The in situ mixed resin system can be performed at temperatures as high as 320° F. whereas the premixed resins are generally not recommended for use at temperatures above 250° F.

Experience has shown that treatments by the in situ mixed system frequently do not result in uniform distribution of the reactive chemicals in the formation. If the liquid solutions containing resin and curing agent are not uniformly distributed in the formation, portions of the resin will not be mixed with the curing agent. Consequently, the unmixed portions of the resin will not harden resulting in only a partially consolidated sheath about the wellbore. Thus when the well is placed on production, the loose sand grains in the unconsolidated portion will be carried into the wellbore creating sand problems.

The poor distribution of chemicals in the formation, to a large extent, is due to the placement technique currently being used in performing the in situ mixed treatments. This technique, known in the art as the "through tubing" technique, involves injecting a solution containing the resin and a solution containing the curing agent in sequential order through the tubing and into the formation. Experience has shown that the curing agent contacts a film of the resin solution left on the tubing wall and reacts therewith to form a viscous, partially cured resinous material. This material enters the curing agent stream and is carried to and deposited on the formation face. The consequent plugging effects prevents the uniform distribution of the curing agent solution throughout the formation. A variety of wiper plugs and related devices have been used in an effort to maintain the reactive chemicals segregated in the tubing. The wiper plugs were found to be unsatisfactory in several respects. Surface irregularities in the tubing string such as collar recesses or internal gas lift mandrels prevented effective use of the wiper plugs. In some instances, use of the wiper plugs actually aggravated the plugging problem. Test showed that wiper plugs wore to the inside diameter of the tubing and left a pulverized material adhering to the tubing wall. This material was picked up in the curing agent stream and carried to and deposited on the formation face.

Thus the through tubing technique has not been entirely successful in placing reactive chemicals in the in situ mixed system mainly because of the combined plugging effects of the pulverized material and reaction products of the resin and curing agent.

SUMMARY OF THE INVENTION

The purpose of the present invention is to provide a method of placing plastic consolidation chemicals in a subterranean unconsolidated formation. The method finds particular advantageous application in the in situ mixed system which depends upon uniform distribution of the resin and the resin curing agent.

The present invention contemplates the injection of the resin solution and the curing agent solution through separate conduits. Thus, the reactive chemicals are maintained separate until they reach the reaction site in the formation. The method does not require the use of wiper plugs nor the use of special solvents.

Broadly, the contemplated method comprises the steps of injecting into an unconsolidated formation through a first conduit a thermosetting resin capable of polymerizing at the temperature of the formation; and injecting into the formation through a second conduit an agent for curing the resin.

In the typical in situ system the steps recited above will be performed in sequence. These systems depend upon the resin contacting and preferentially wetting the sandstone before polymerization is initiated.

In most applications, the first and second conduits will be provided by a tubing string and the casing-tubing annulus, respectively. However, in special situations where precise volumetric control is desired, the conduits can be provided by parallel tubing strings.

BRIEF DESCRIPTION OF THE DRAWING

The drawing is a schematic diagram of a well shown penetrating an unconsolidated formation.

DESCRIPTION OF THE PREFERRED EMBODIMENTS

With reference to the drawing, a wellbore 10 is shown penetrating a subterranean unconsolidated formation 11. A casing 12 cemented in place traverses the formation 11 and is provided with a perforated interval 13 opposite the producing zone. The casing 12 has a surface connection 14 adapted to be connected to surface operating facilities. Preparatory to commencing the sand consolidation treatment, a tubing string 15 is lowered down the casing 12 until its lower end 16 is located near the perforated interval 13. This concentric arrangement of the tubing 15 and casing 12 defines an annulus 19. Although not required in all applications, the lower end of the tubing string 15 can be provided with a packer 17. A surface connection 18 provides means for connecting the tubing string 15 to surface facilities.

Basically, the plastic consolidation treatment according to the in situ mixed system comprises the sequential injection of a solution containing a liquid resin into the formation followed by the injection of a solution containing a curing agent which, when contacting the resin, initiates and accelerates polymerization. This causes the resin to harden forming a rigid permeable sheath about the wellbore 10. It is important that the resin and the curing agent be maintained separate from one another during placement operations in order to avoid the adverse effects of partial curing of the resin in the tubing.

In contrast to the prior art placement techniques used in the in situ mixed systems, the present invention contemplates the injection of the resin solution and the curing agent solution through separate conduits. This ensures that the resin-forming components are not brought in contact with one another until they reach the reaction site, the formation.

In new completions, the completion fluid is displaced from the casing 12 by pumping a hydrocarbon liquid such as diesel oil down the annulus 19 while taking returns through the tubing 15. In treating wells which have been produced the diesel oil can be injected in a similar manner after the well has been killed and after the tubing 15 has been run.

In the typical application of the present invention, the tubing string 15 provides one conduit and the annulus 19 the second conduit. However, parallel tubing strings can serve equally as well and in certain applications could offer the advantage of better volumetric control.

Generally, the volume of the curing agent solution greatly exceeds the volume of the resin. Thus in the concentric conduit arrangement illustrated in the drawing and described above, the annulus 19, having a capacity substantially greater than the tubing 15, will be used to conduct the curing agent solution. The smaller flow area of the tubing 15 also reduces the tendency of the resin solution to bypass the fluid ahead of it.

With the tubing 15 properly located in the casing 12 and with the packer 17 (if used) unseated, the casing connection 14 is connected to the curing agent solution pumping facilities 20. The proper volume of the curing agent solution is pumped down the annulus 19 while taking returns of diesel oil through the tubing 15. The volume of the solution pumped down the annulus 19 is controlled so that the solution-diesel oil interface indicated at 22 is located a few feet above the lower end 16 of the tubing 15.

The curing agent solution can be preceded by a buffer solution such as a refined paraffinic white oil. In this event the volumes are controlled so that the interface of the buffer solution and curing agent solution is located above the tubing end 16.

If the density of the curing agent solution is greater than the diesel oil, the packer 17 should be used to prevent the fluid in the annulus 19 from gravitating below the tubing end 16. With the curing solution properly placed in the annulus 19, the packer 17 is set by manipulating the tubing 15.

The tubing connection 18 is then connected to the pumping facilities 21 for resin solution. A preflush solution generally precedes the resin solution in order to condition the zone to be treated. The preflush and resin solutions are pumped down the tubing 15 forcing the diesel oil ahead of it into the formation 11. The volume of resin solution in a particular treatment depends upon the size of the zone to be treated which varies from well to well. The recommended treatment volumes range from about 20 to about 70 gallons per foot of perforations. The preflush and resin solution are injected into the formation at matrix injection pressures. The resin solution invades the formation in a generally cylindrical flow pattern from the wellbore 10 and preferentially wets the sand grains in the invaded zone. After the proper volume of resin solution has been introduced into the tubing 15, diesel oil is used to displace the resin solution from the tubing 15. When the resin solution has been substantially displaced from the tubing 15, the packer 17 is unseated permitting the injection of the curing agent solution by pumping diesel oil down the annulus 19. The curing agent solution invades the formation 11 displacing the resin solution ahead of it, leaving a residual film of the resin on the sand grains. The mixing of the curing agent with the resin initiates and accelerates the polymerization process. When all of the curing agent solution has been displaced from the annulus 19, the well is shut in for a sufficient period to permit the curing of the resin which forms a continuous permeable consolidated sheath about the wellbore 10. The final step in the operation is to place the well on production. Formation fluids flush the carrier fluid for the curing agent from the formation.

The placement technique according to the present invention can be used with any of the currently available plastic consolidation processes which include a phenol-formaldehyde resin process, an epoxy resin process, and furfuryl alcohol resin process. All of these processes employ a resin solution and a curing agent or catalyst solution which can be placed sequentially in the formation in accordance with the in situ mixing technique.

The phenol-formaldehyde resins can be prepared by the reaction of formaldehyde, acetaldehyde, propionaldehyde or a mixture of water-soluble aldehydes with a low molecular weight hydroxy aryl compound such as phenol, cresol, $\beta$ naphthol, resorcinol, xylenol, cresylic acid or a mixture of such compounds in a weight ratio between about 1:1 and about 9:1. Curing agents suitable for these resins include an alkaline catalyst such as guanidine carbonate, aminoguanidine bicarbonate, sodium hydroxide, sodium carbonate, ethyl amine, triethyl amine, aniline, ethylene diamine, or the like, or an acid catalyst such as stannous chloride, magnesium chloride, hydrochloric acid, sulfuric acid, maleic anhydride, picric acid, benzene sulfonic acid, sulfanilic acid, $\alpha$ naphthylamine sulfonic acid, sodium-1 naphthlamine-3,6, 8-trisulphonate, or the like.

Useful epoxies include the diglycidyl ethers of bisphenol A [bis (4-hydroxy phenol) dimethyl methane] obtained by the reaction between epichloro-hydrin (1-chloro-2,3 epoxy propane) and bisphenol A in the presence of an alkali such as sodium hydroxide or potassium hydroxide. Similar resins can be prepared by reacting a mononuclear di- or trihydroxy phenol such as resorcinol, hydroquinone, pyrocatechol, or phloroglucinol or a poly-nuclear polyhydroxy phenol such as 4,4-dihydroxy biphenyl with a halohydrin such as 1,2-dichloro-3-hydroxy propane or dichlorohydrin. Still other satisfactory materials include the commercial epoxy resins prepared by the condensation of novolac resins with epichlorohydrin.

The curing agents for the epoxy resins include aliphatic and aromatic amines such as diethylene triamine, ethylene diamine, triethylene tetramine, dimethylamino propylamine, diethylamino propylamine, piperidine, methane diamine, triethylamine, benzyldiethylenediethylamino phenol, ditrimethylaminomethyl-phenol, $\alpha$ methylbenzyl dimethylamine, meta xylenediamine, 4,4-methylene dianiline, and mixtures of such amines. Acidic catalysts such as oxalic acid, phthalic acid, pyromellitic acid, pyromellitic dianhydride, and dodecenyl succinic anhydride can also be employed.

The epoxy resin solution is prepared by dissolving a liquid epoxy in a solvent such as a mixture of ethyl alcohol, acetone or ethyl ketone with kerosene, diesel oil or white containing added aromatics. The curing agent solution can be prepared by dissolving or suspending the catalyst in kerosene or similar oil that is substantially free of aromatics.

The furfuryl alcohol resins are generally utilized by injecting furfuryl alcohol, furfuryl alcohol resin, or a mixture of the alcohol and resin into the formation and thereafter pumping in an oil overflush solution containing a low molecular weight organic acid such as trichloroacetic acid or a delayed acid-producing chemical as a catalyst or curing agent.

In all of these processes an oil preflush containing a surface active agent is generally used to remove water blocks and render the sand preferentially wet. The resin solution usually contains a surfactant and a silane compound designed to improve bonding to the sand grains.

A treatment procedure illustrating the application of the present invention in connection with an epoxy resin process can be as follows:

1. The well is killed by pumping salt water down the casing.

2. A tubing string is run inside the casing and located with its lower end opposite the top of the perforated interval.

3. The salt water is replaced with diesel oil by circulating into the annulus and taking returns on the tubing. The specific gravity of the diesel oil is about 0.83.

4. A curing agent solution is prepared in surface facilities by mixing an amine catalyst (DMP-30 manufactured by Rohm and Haas Company) and a paraffinic white oil in volume ratios of about 1:50. The total volume of the curing agent solution prepared will depend upon the length of the zone to be treated. Two hundred and fifty gallons per linear foot of the zone to be treated should be sufficient for most applications. The curing agent solution mixed in accordance with the 1:50 ratio will have a specific gravity of about 0.87.

5. The curing agent solution is pumped through the casing connection and down the annulus and followed by diesel oil, returns being taken through the tubing. The total volume of liquid pumped down the annulus is controlled so that the leading end of the curing agent solution is located a few feet above the lower end of the tubing.

6. An epoxy resin solution is prepared in surface facilities by mixing a liquid epoxy (Araldite 6005 manufactured by CIBA Products Company) and acetone in a volume ratio of about 4:1. About 0.5 volume percent of an organofunctional silane (Z 6020 manufactured by Dow Corning Corporation() is added to the mixture. The total volume of the prepared resin solution should provide a treatment of about 65 gallons per linear foot of the zone to be treated. The resin solution mixed at the 4:1 ratio will have a specific gravity of about 1.09.

7. A preflush of a monobutyl ether of ethylene glycol is pumped down the tubing. The volume of preflush should provide a treatment of about 50 gallons per linear foot of the zone to be treated. The preflush displaces the diesel oil from the tubing forcing it into the formation. A separation ball composed of resilient material such as rubber can be inserted in the stream between the diesel oil and preflush solution to prevent the preflush solution from bypassing the diesel oil.

8. The resin solution is pumped down the tubing immediately after the preflush. A separation ball can be inserted in the stream between the preflush and the resin solution for preventing the resin solution from bypassing the preflush solution. The resin solution displaces the preflush from the tubing and forces it into the formation.

9. After the proper volume of the resin solution has been pumped into the tubing, diesel oil is then used to displace the resin solution from the tubing forcing it into the formation. Pumping into the tubing is discontinued when substantially all of the resin solution is displaced from the tubing. The tubing connection is then closed.

10. Diesel oil is pumped through the casing connection and down the annulus forcing the curing agent solution into the formation. Pumping is discontinued when substantially all of the curing agent solution is displaced from the annulus.

11. The well is then shut in for a sufficient period to permit the resin to harden.

12. The well is then placed on production.

A significant feature of this process is that neither wiper plugs nor special solvents are required to maintain the chemicals segregated during the placement operations.

It should be observed that the separate conduits 15 and 19 which maintain the chemicals separate during the placement operations permit a mixing technique which has not been used heretofore in sand consolidation treatments. After the chemicals have been properly spotted at the bottom of their respective conduits, the simultaneous injection of the chemicals at proper volumetric rates provides mixing within the wellbore 10 and during the invasion of the formation 11. The highly exothermic reaction can be tolerated because of the relatively short span of time between initial contact of the reactive chemicals and their placement in the formation 11. The mixture then can be followed with an after flush for creating flow passages in the treated zone of the formation 11.

I claim:

1. In a method for the consolidation of a subterranean formation surrounding a wellbore wherein at least two reactive resin-forming components are injected into the formation and permitted to react therein to form a solid resin, the improvement wherein one of the reactive components is injected into the formation through a first conduit which extends from the surface to an elevation in the wellbore proximate the formation, and thereafter the other of the reactive components is injected into the formation through a second conduit which extends from the surface to an elevation in the wellbore proximate the formation.

2. The invention as recited in claim 1 wherein said one of the reactive components is a liquid thermosetting resin and said other of the reactive components is a curing agent for said thermosetting resin.

3. The invention as recited in claim 2 wherein the first conduit is arranged concentrically in the second conduit.

4. The invention as recited in claim 2 wherein the thermosetting resin is an epoxy resin.

5. The invention as recited in claim 2 wherein the thermosetting resin is a phenol-formaldehyde resin.

6. A method for sequentially placing a solution containing a thermosetting resin and a solution containing a curing agent for said resin in an incompetent formation surrounding a wellbore provided with two conduits which extend from the surface to a subsurface elevation near the formation, the method comprising the steps of: placing said solution containing the curing agent in one of said conduits, the leading portion of said solution being positioned near the lower end of said one of said conduits; pumping said solution containing the thermosetting resin through the other of said conduits and into the formation; displacing said solution containing the curing agent from said one of said conduits into the formation; and permitting the resin to harden.

7. The invention as recited in claim 6 wherein the liquid thermosetting resin is an epoxy resin and the curing agent is a catalyst reactive with the epoxy resin to impart a set thereto at formation conditions.

8. The invention are recited in claim 6 wherein the liquid thermosetting resin is a phenol-formaldehyde resin and the curing agent is a catalyst reactive with the phenol-formaldehyde resin for imparting a set thereto at formation conditions.

9. A method for consolidating a subterranean formation surrounding a wellbore which comprises sequentially injecting a liquid thermosetting resin into said formation through one conduit in said wellbore and injecting a curing agent for said thermosetting resin into said formation through another conduit in said wellbore, said conduits extending from the surface to an elevation proximate said formation; and permitting said thermosetting resin to harden.